Dec. 3, 1968 A. LICHOWSKY 3,414,684

VIDEO RECORDER AND/OR REPRODUCER WITH INTERMEDIATE TAPE DRIVE

Filed Feb. 5, 1965 8 Sheets-Sheet 1

INVENTOR
ABRAHAM LICHOWSKY
BY Floyd M. Harris
Attorney

VIDEO RECORDER AND/OR REPRODUCER WITH INTERMEDIATE TAPE DRIVE

Filed Feb. 5, 1965

INVENTOR
ABRAHAM LICHOWSKY
BY Floyd M. Harris
Attorney

INVENTOR
ABRAHAM LICHOWSKY
BY Floyd M. Harris
Attorney

Dec. 3, 1968 A. LICHOWSKY 3,414,684

VIDEO RECORDER AND/OR REPRODUCER WITH INTERMEDIATE TAPE DRIVE

Filed Feb. 5, 1965 8 Sheets-Sheet 4

INVENTOR.
ABRAHAM LICHOWSKY
BY
Floyd M. Harris
Attorney

INVENTOR.
ABRAHAM LICHOWSKY
BY Floyd M. Harris
Attorney

VIDEO RECORDER AND/OR REPRODUCER WITH INTERMEDIATE TAPE DRIVE

Filed Feb. 5, 1965 8 Sheets-Sheet 6

INVENTOR
ABRAHAM LICHOWSKY
BY Floyd M. Harris
Attorney

INVENTOR.
ABRAHAM LICHOWSKY
BY Floyd M. Harris
Attorney

INVENTOR.
ABRAHAM LICHOWSKY
BY Floyd M. Harris
Attorney 3,414,684
Patented Dec. 3, 1968

3,414,684

VIDEO RECORDER AND/OR REPRODUCER WITH INTERMEDIATE TAPE DRIVE

Abraham Lichowsky, Los Angeles, Calif., assignor to Radio Corporation of America, a corporation of Delaware Filed Feb. 5, 1965, Ser. No. 430,536
9 Claims. (Cl. 179—100.2)

ABSTRACT OF THE DISCLOSURE

A technique for reduction of tape stretch variations in tape recorders where the tape is pulled around a mandrel. The reduction of tape stretch is accomplished by locating the tape drive capstan at a point which is intermediate of the entry and exit points of the tape wrap around the mandrel. Where a full tape wrap of 360 degrees is formed, the capstan can be located 180 degrees around the wrap with the tape leaving the mandrel at this 180 degree point and passing over the capstan before returning to the mandrel. Thus, the tape pulled by the capstan is in contact with only 180 degrees of the mandrel.

This invention relates to tape recorders and reproducers, and particularly to improvements in slant track recorders and reproducers of the type in which the lines of recording or record traces are positioned diagonally on the tape. In one version of this type of recorder, the tape is wrapped helically once around a pair of stationary cylinders or mandrels positioned end-to-end with a slight gap between them. A disc or headwheel carrying a record-reproduce head is positioned to rotate at high speed in the gap between the mandrels. The tape is driven longitudinally from a storage reel around the mandrels to a take-up reel. When signals are applied to the record-reproduce head, the signals are recorded on the tape in a series of parallel bands or tracks disposed diagonally with respect to the tape.

In tape recording-reproducing systems of the type in which the tape is pulled around a mandrel, there is a certain amount of tension in the tape as it is pulled around the mandrel. This tension determines the tape stretch and, therefore, the effective diameter that the tape assumes on the mandrel. In order to properly reproduce a signal from the recorded tracks on the tape, the effective tape diameter should be the same or substantially the same upon reproduction of the signal as it was in recording the signal. Therefore, there should be no more than a minor variation in the tape tension during recording and reproduction If such a condition does not exist, upon reproduction the signal recording-reproducing devices are not properly maintained in alignment with the recorded tracks, preventing completely satisfactory reproduction of the recorded signal.

An object of the invention is to provide an improved tape recorder and/or reproducer.

A further object of the invention is to provide an improved means for minimizing variations in tape stretch in a tape recorder and/or reproducer.

A further object of the invention is to provide improved means for reducing tape stretch in a tape recorder and/or reproducer of the type in which the tape wraps around a mandrel.

A still further object of the invention is to provide an improved tape recorder and/or reproducer of the type in which the lines of recording are positioned diagonally on the tape.

A still further object of the invention is to provide an improved helical scan magnetic tape recorder and/or reproducer in which variations in tape stretch are minimized.

In accordance with a preferred embodiment of the present invention, variations in tape stretch are reduced in a helical scan system of the type wherein a full tape helix of approximately 360 degrees is formed, by locating the tape drive capstan halfway around the 360 degree tape helix so that the tape pulled by the capstan is in contact with only approximately 180 degrees of the mandrel. Thus, the capstan pulls the tape through the first half helical wrap and meters it through the second half helical wrap while the supply tension and the take-up tension are being controlled for repeatable tension of the helical loop of tape. With this arrangement, tape tension variations due to variations in the coefficient of friction are less than in prior art arrangements where the capstan is located at either end of the 360 degree helix loop. Therefore, variations in the amount of tape stretch are reduced.

With the present invention, tape tension variations due to friction variations in each half helical wrap in the particular embodiment described will be less than 35% for coefficient of friction changes from 0 up to 0.1. This is seen from the equation for the ratio of exit tension to supply tension which equals $e^{\mu\beta}$ where $e$ is the natural logarithm base, $\mu$ is the coefficient of friction, and $\beta$ is the amount of helical wrap-around in radians. In the embodiment described, the tape wrap-around from the supply or entrance point on the mandrel to the exit point where it leaves the mandrel to go to the capstan is about 3 radians. The tension ratios for the two halves of the full 360 degree helix are:

$$\frac{\text{First Half Exit Tension}}{\text{Supply Tension}}=\frac{\text{Take-up Tension}}{\text{Second Half Entrance Tension}}=e^{\mu\beta}=e^{0.1(3)}=e^{0.3}=1.35$$

for coefficient of friction of 0.1. For a coefficient of friction of 0, the tension ratio is 1. Thus, the maximum possible tension variation is 35%, and, in practice, would be less than 35% as the coefficient of friction will not go to zero. Assuming a practical case where the minimum value for the coefficient of friction is .05, $e^{\mu\beta}=e^{.15}=1.28$, it can be seen that the maximum variation in tension will be less than 7% (35% less 28%).

Compare this with an arrangement where the capstan is located at the end of the 360 degree helix so that the wrap-around of the tape helix is approximately 360 degrees or 6 radians. Then the maximum tension ratio is $e^{0.1(6)}=1.82$, and the minimum tension ratio is $$e^{0.05(6)}=1.35$$

In this case the maximum possible tension variation is 42%, which is six times the maximum tension variation that is possible when a recorder of this type is designed in accordance with the present invention.

In a preferred embodiment of the present invention, one 360 degree rotation of the record-reproduce head scans approximately 360 degrees of the tape helix. In one preferred embodiment of the invention as applied to video recording for television use, one full picture frame is recorded or reproduced by each 360 degree rotation of the record-reproduce head; the first field being recorded during the first 180 degrees of rotation, and the second field being recorded during the second 180 degrees of rotation. This is assuming recording of an interlaced television picture. In this embodiment, the full picture frame is recorded in a single diagonal track from near one edge of the tape to near the other edge of the tape.

The present invention is not limited to slant track recorders and/or reproducers, but applies, in general, to any unit in which the tape is pulled around a mandrel with which the tape has a certain amount of frictional contact.

The invention will be described in detail with reference to the accompanying drawing in which.

In the several figures, like parts are indicated by similar reference characters.

Figures 1, 2:
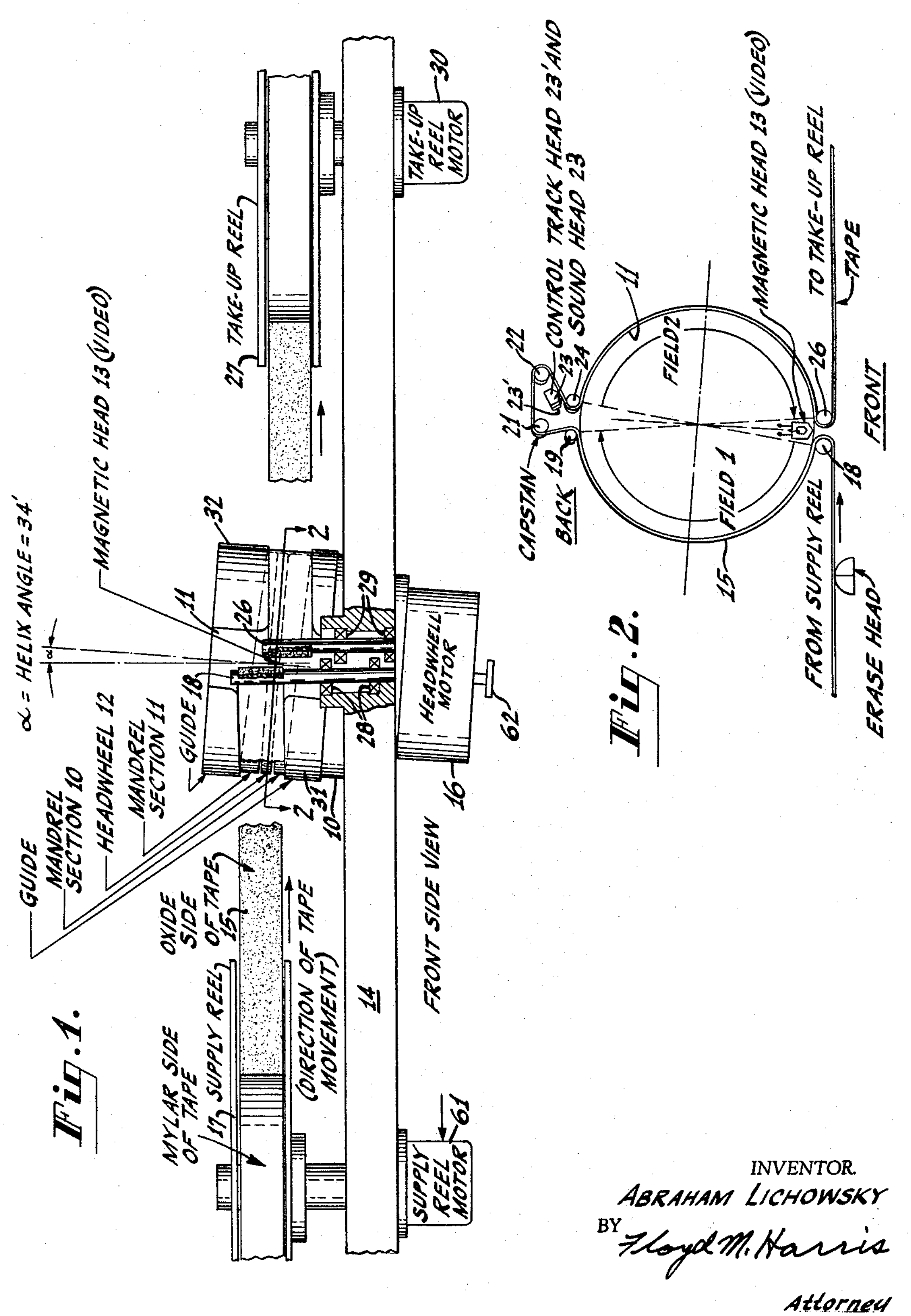
FIG. 1 is a front view of a tape recorder and/or reproducer embodying the invention.
FIG. 2 is a schematic diagram of a view of FIG. 1 taken on the line A—A looking in the direction of the arrows.

The invention will be described, by way of example, as applied to a magnetic tape recorder and/or reproducer of the slant track type in which the tape is wrapped in a helix around a stationary mandrel. Refer to FIG. 1 which shows a recorder of this type, the drawing not being to scale. The mandrel comprises two cylinders 10 and 11 positioned end-to-end with a gap between. A disc or headwheel 12 is mounted to rotate at high speed in the gap between the mandrel sections 10 and 11. The headwheel 12 carries a magnetic head 13 for either recording or reproducing signals, in the present example, video signals.

The two mandrel sections 10 and 11 are mounted on a mounting panel 14 in fixed relation thereto. The headwheel is mounted on an axis (not shown) which is driven by a motor 16. The headwheel axis and the axis of the mandrel are coaxial.

The magnetic tape 15 from the supply reel 17, a section of it being broken away, passes around an entrance roller 18 where it enters and wraps around the mandrel 10, 11 for approximately 180 degrees, then exits around an exit roller 19 at the back side of the mandrel (see FIG. 2) becoming a loop of tape which passes over a capstan 21, then over an idler roller 22, around a double magnetic head which comprises a sound head 23 for sound and a control track head 23' for recording or reproducing track control pulses, and then over another entrance roller 24 from which point the tape wraps around approximately the second 180 degrees of the mandrel, and finally passes around an exit roller 26 and on to the take-up reel 27 which is driven by a take-up reel torque motor 30.

The control track head 23' preferably is located at the tape loop so that it is at about the half way position on the 360 degree helix because this reduces any reproducing error of the control track pulses that may be caused by slight errors in the tape tension. With this positioning of the head 23' any such error is substantially less than it would be if the head 23' were positioned at a point preceding or following the 360 degree helix. Positioning the head 23' at the tape loop also minimizes any similar error in recording the control pulses. The sound head 23 preferably is located at the same location as the head 23' for reasons of economy in construction.

The entrance roller 18 and exit roller 26 are mounted with their axes at right angles to the mounting panel 14, the surface of which will be referred to as a reference plane. They are supported by bearings 28 and 29, respectively. The rollers 19 and 24 (FIG. 2), the capstan 21 and the idler 22 rotate about axes that are at an angle $2\alpha$ with respect to the perpendicular to the mounting panel 14 or reference plane, as will be described with reference to FIGS. 3 and 4. The bearings of the rollers and the idler preferably are jewel bearings. The supply and take-up reels rotate about axes that also are at right angles to the mounting panel 14 or reference plane.

In order that the tape 15 will wrap around the mandrel in a helix, the mandrel 10, 11 is mounted on the panel 14 with its axis at a slight angle $\alpha$ to the perpendicular to the panel 14 or reference plane. This is referred to as the helix angle and, in the present example, is 34 minutes as indicated in FIG. 1. The axis of rotation of the headwheel is mounted at this same helix angle, the axes of the mandrel and headwheel being coaxial.

Guide strips 31 and 32 are wrapped around and secured to the mandrel for the purpose of guiding and holding the tape in its helical path as it is pulled over the mandrel. The tape is guided so that one edge of the tape at the entrance point (adjacent to roller 18) is positioned to one side of the plane of rotation of the head 13 so that said head as it rotates comes into recording relation to the tape at a small distance from said one edge and also guided so that the other edge of the tape at the exit point is positioned to the other side of the plane of rotation of the head 13 so that head as it rotates moves out of recording relation to the tape at a small distance from said other edge of the tape whereby along each edge of the tape there is a narrow strip on which no recording is made by the head 13 during recording.

Figure 3:
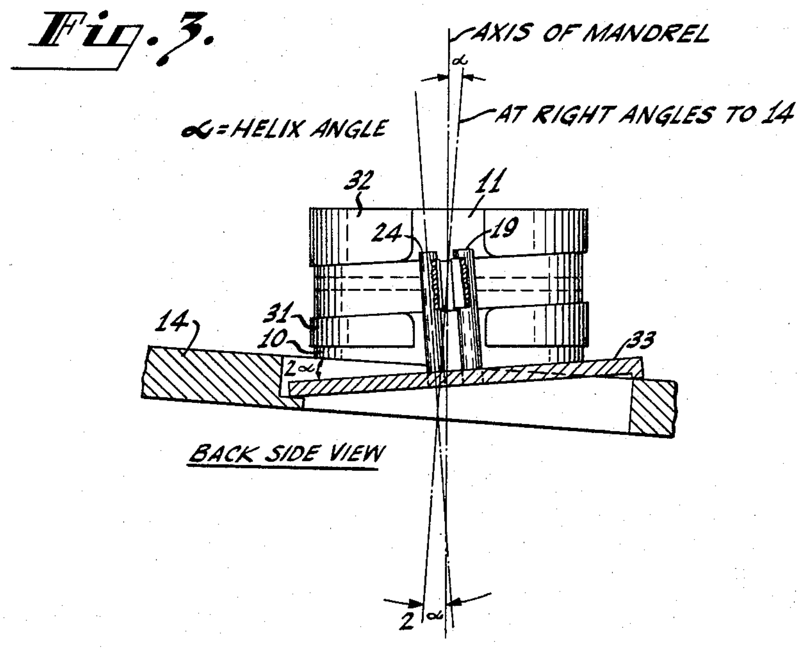
FIG. 3 is a view, partly in section, looking at the back side of the mandrel shown in FIG. 1.
Figure 4:
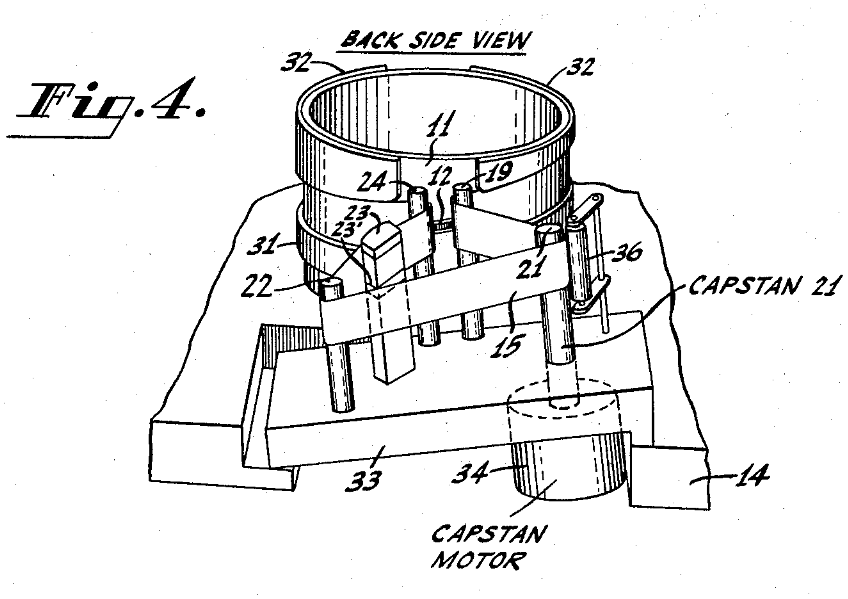
FIG. 4 is a perspective view looking at the back side of the mandrel shown in FIG. 1.

Refer to FIGS. 3 and 4 which are views from the back side of the recorder as illustrated in FIG. 1. FIG. 4 is a perspective view which shows the rollers 19 and 24, the idler 22, and the magnetic heads 23 and 23' mounted on a sub-panel 33 which is mounted on the panel 14 at an angle thereto. The rollers 19 and 24 and the idler 22 rotate about axes that are perpendicular to the sub-panel 33. The capstan 21 also rotates about an axis that is perpendicular to the sub-panel 33. It is driven by a capstan motor 34 which is mounted on the sub-panel 33. A pressure roller 36 holds the tape 15 against the capstan.

FIG. 3 is a back side view which is partly in section. As shown in this view, the tape exit roller 19 and the tape entrance roller 24 have their axes positioned at an angle of $2\alpha$ with respect to the perpendicular to the mounting panel 14 or reference plane, $\alpha$ being the helix angle. Stated differently, these roller axes are positioned at an angle $\alpha$ with respect to the axis of the mandrel 10, 11, the mandrel axis being set at the helix angle $\alpha$ with respect to the perpendicular to the mounting panel 14 or reference plane. The axes of the capstan 21 and the idler 22 (FIG. 4) are also set at the angle $2\alpha$ with respect to the perpendicular to the panel 14 or reference plane.

Figure 5:
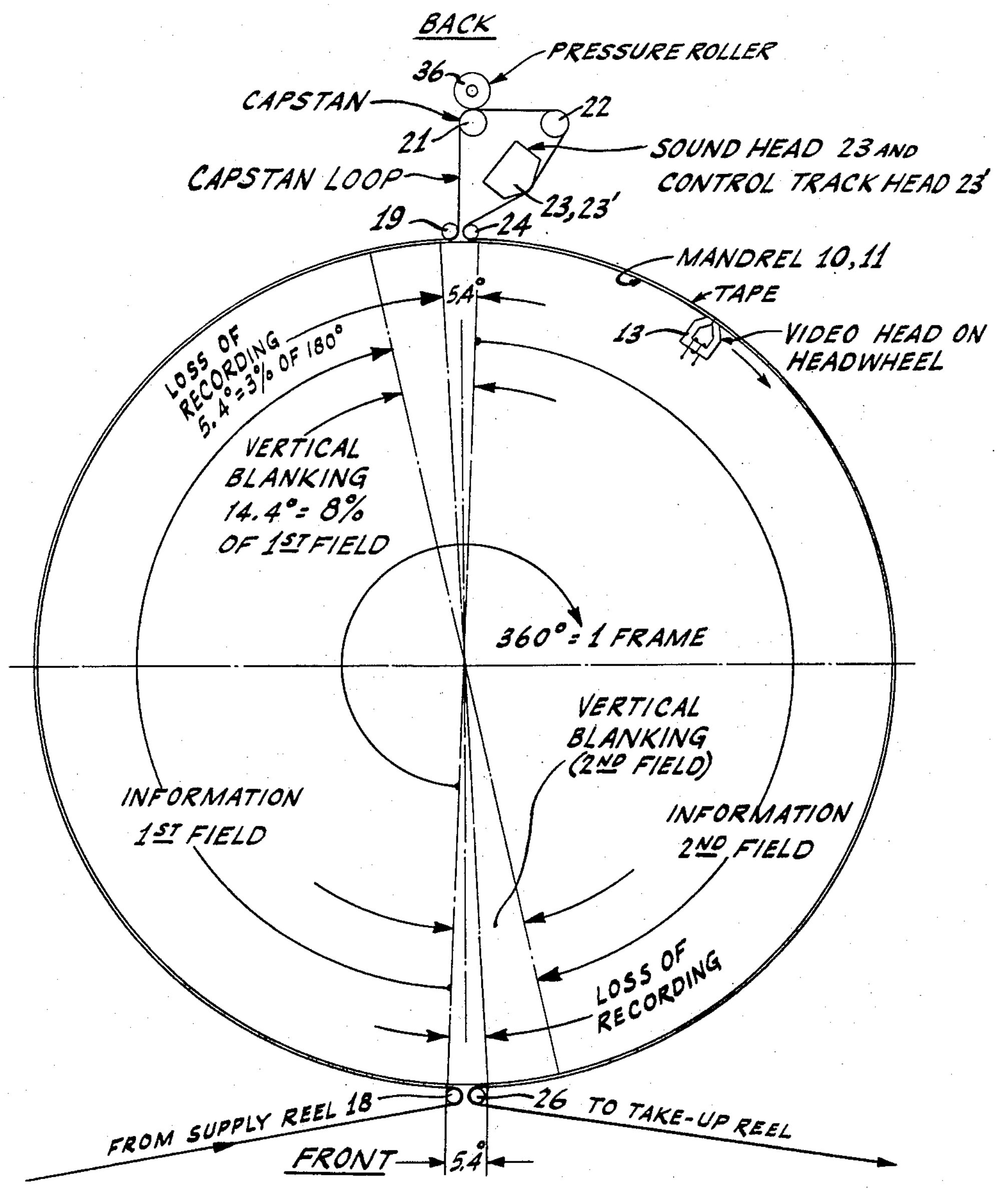
FIG. 5 is a schematic diagram representing the tape wrapped around approximately 360 degrees of the mandrel, with a loop formed at approximately 180 degrees of the wrap where the tape is pulled by a capstan.

FIG. 5 is similar to FIG. 2 but on a larger scale to provide for legends. The legends illustrate the recording of television video signals. One picture frame is recorded during each 360 degree rotation of the headwheel. As indicated, the first field is recorded as the video head rotates from entrance roller 18 to exit roller 19. The second field is recorded as the video head rotates from entrance roller 24 to exit roller 26. These two fields are recorded on a line diagonal to the tape length, and from near one edge of the tape to near the other edge of the tape. As the headwheel rotates rapidly, the tape is pulled forward comparatively slowly so that during the next rotation of the headwheel the next frame is recorded on a diagonal line parallel to the preceding line or track.

It will be noted that there is a small loss of recording from just preceding entrance roller 19 to just following exit roller 24. This loss is from the point where the tape leaves the mandrel and the video head to the point where the tape makes contact with the mandrel and video head. There is a similar loss of recording at the entrance and exit rollers 18 and 26. In the present example this recording loss occurs through an angle of 5.4 degrees. Also, in the example assumed, the vertical blanking for the television picture occurs through an angle of 14.4 degrees. Since the loss of signal occurs near the end of the vertical blanking period, the signal loss does not cause any difficulty.

Figures 6A, 6B:
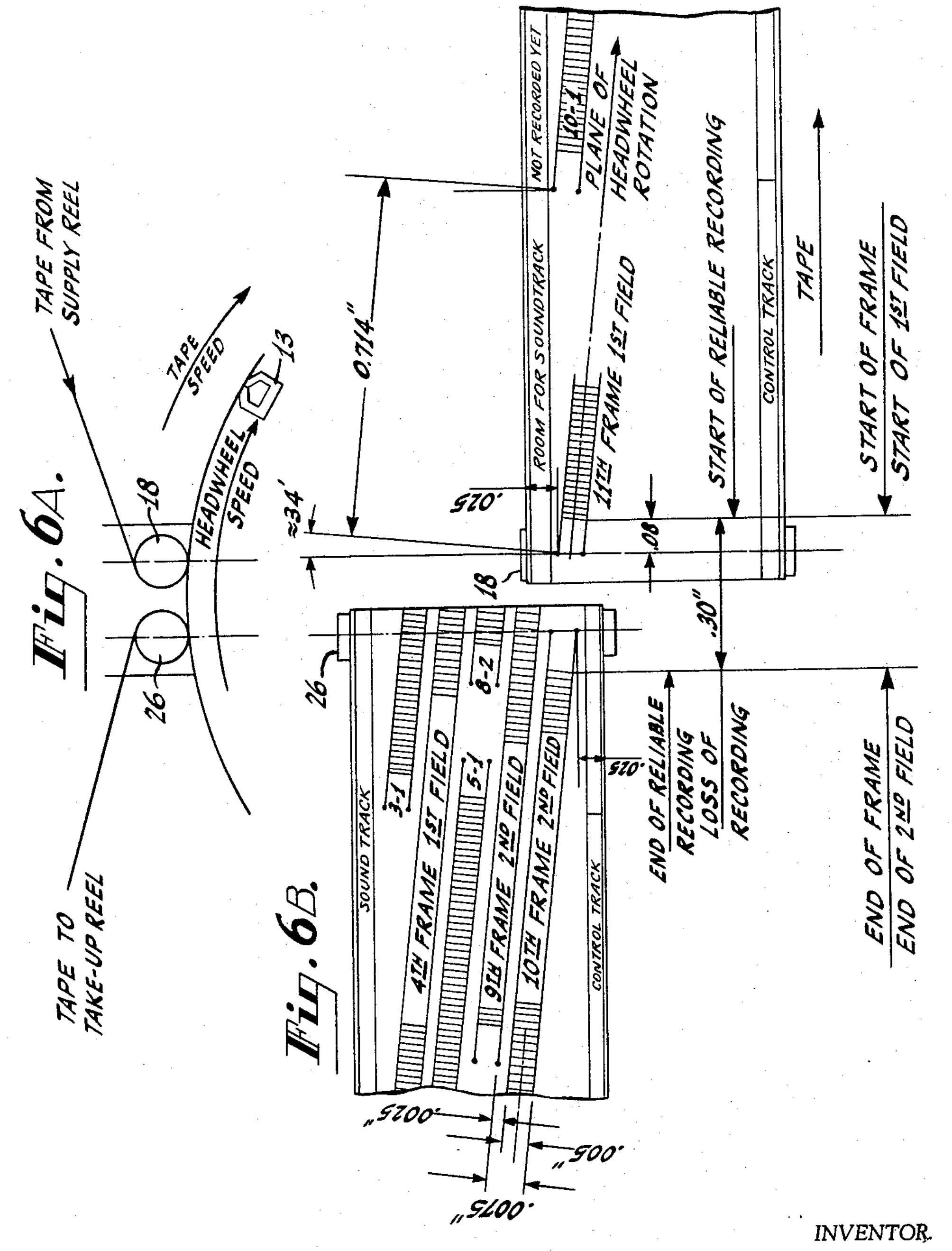
FIG. 6A is a schematic diagram representing the tape and roller at the point of tape entry to the mandrel, and the tape and roller at the point of tape exit from the mandrel (at the front side of the mandrel shown in FIG. 1)
FIG. 6B is a schematic diagram, not to scale, illustrating tape portions with record traces thereon, the tape portions being one portion from the point of tape entry on the mandrel, and the other portion being from a point just prior to exit from the mandrel.
Figures 7A, 7B:
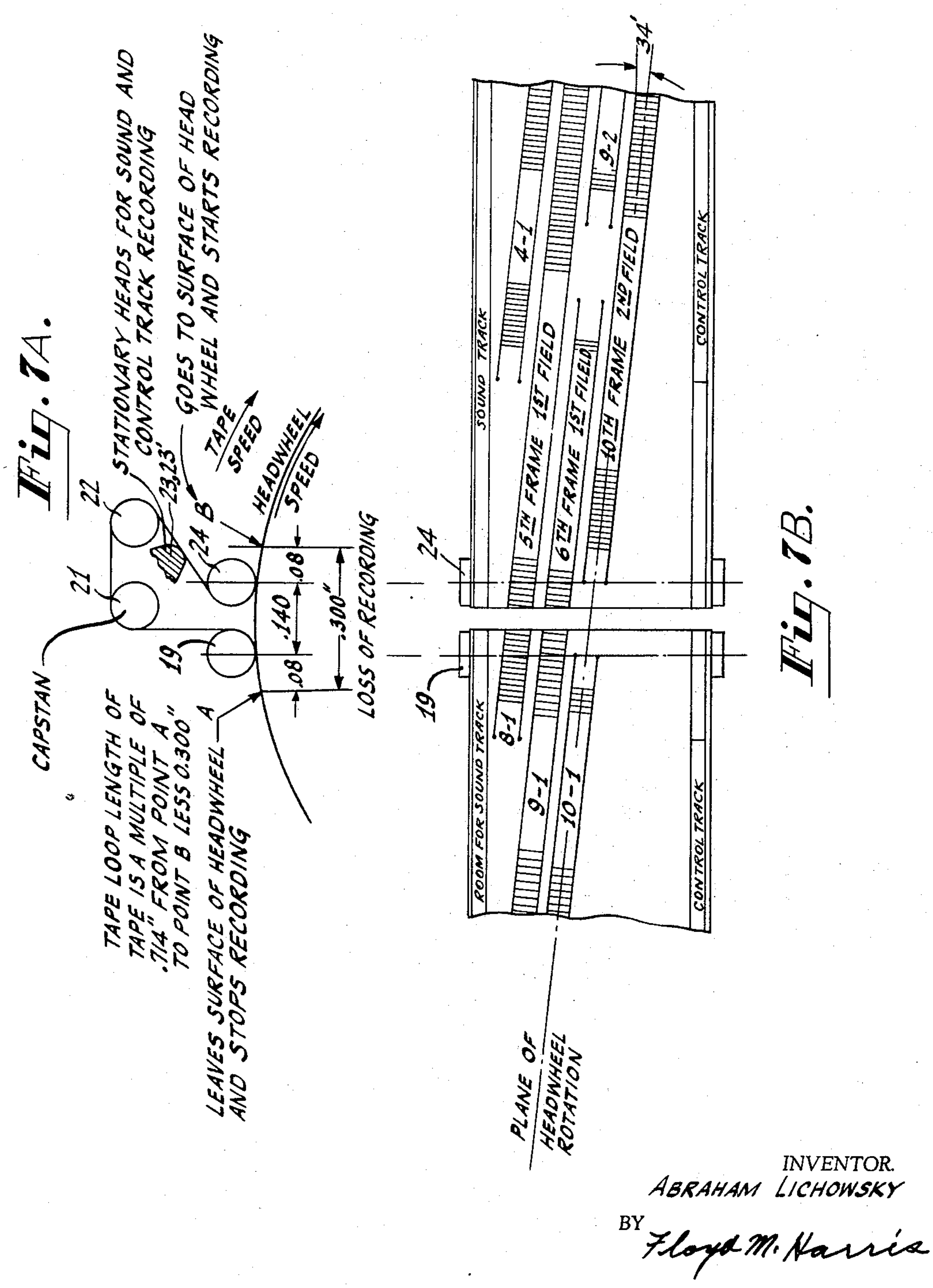
FIG. 7A is a schematic diagram representing the tape loop (at the back side of the mandrel shown in FIG. 1) with its associated capstan and rollers.
FIG. 7B is a schematic diagram (not to scale) illustrating tape portions with record traces thereon, one of these tape portions being from a point just prior to entry into the loop that is engaged by the capstan, and the other tape portion being from the point of exit from the loop.
Figures 8A, 8B, 8C:
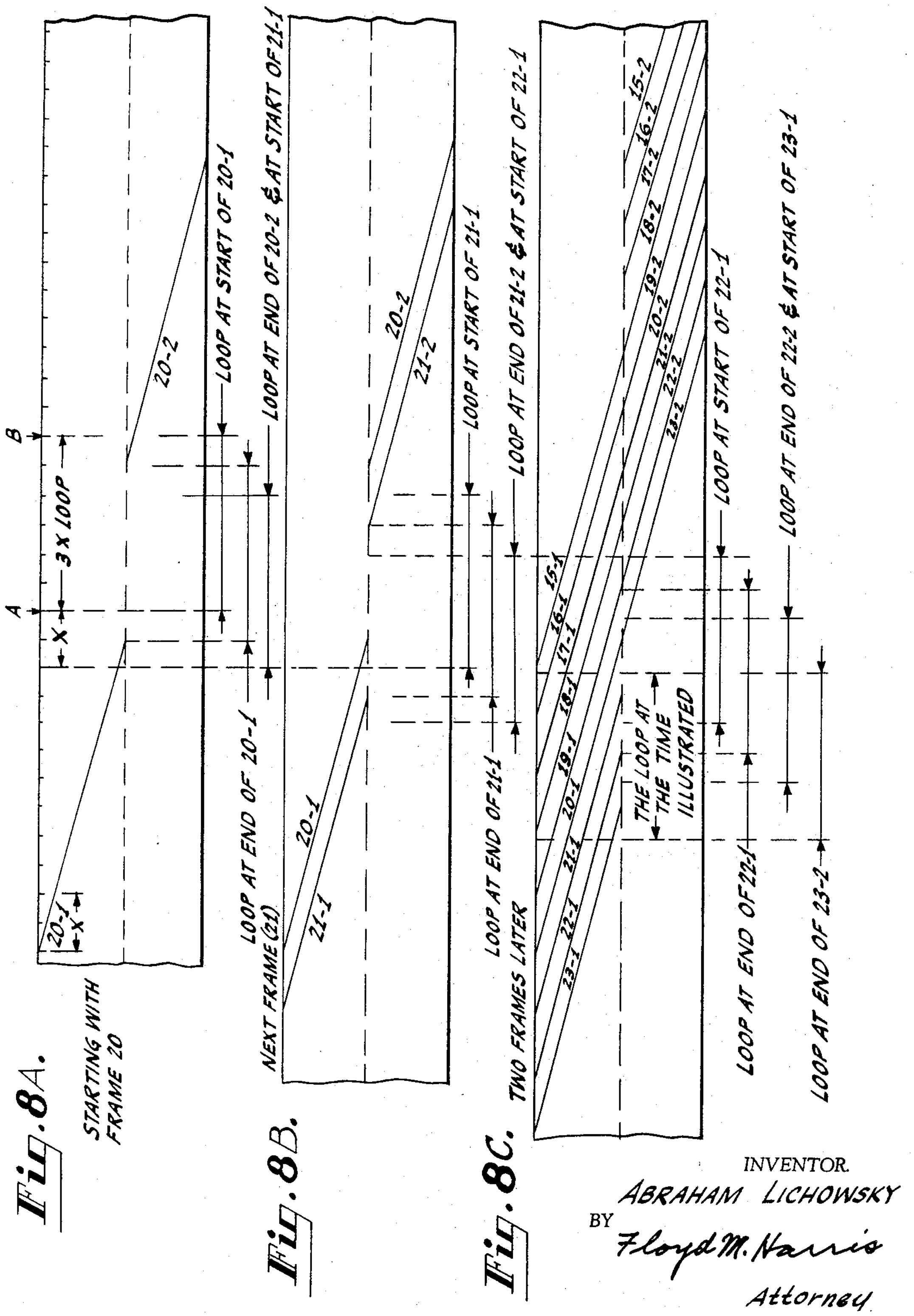
FIGS. 8A, 8B and 8C are diagrams (not to scale) illustrating record traces on the tape, these diagrams illustrating the relation of the record traces outside the tape loop to those inside the tape loop.

For further information as to how the record traces are positioned on the tape, refer to FIGS. 6A through 8C. The way the record traces are positioned is referred to as the tape format. In the drawing the tape format is not drawn to scale, and the format illustrated in FIGS. 8A, 8B and 8C is on a different scale than the format illustrated in FIGS. 6B and 7B. The reason for not illustrating the tape format to scale will be understood from the following data for one example of the invention: Tape of one-quarter inch width is used. The track length required to record one picture frame (one diagonal line) is twenty inches. A record track width is 5 mils, the center to center record track spacing being 7.5 mils. The number of parallel diagonal record tracks on the tape will be in the order of thirty or more.

FIG. 6B illustrates the record traces on the tape at the front of the mandrel, the location of the tape on the mandrel being shown by FIG. 6A. Considering the orientation of these record traces in the view of FIG. 1, FIG. 1 should be turned so that the supply reel 17 is at the right (as in FIG. 6A), and the record traces are then viewed looking at FIG. 1 from the front and looking through the tape to the tracks on the back side of the tape. The tape and headwheel are moving in the same direction. Recording of the 11th frame, first field has just begun. The last frame recorded is frame 10. Note that it starts near one edge of the tape as frame 10, field 1 (marked 10–1) and finishes near the other edge of the tape as frame 10, field 2. Part of the preceding frame 9, field 2 is shown. A small part of frame 8, field 2 is shown with the record trace of frame 5, field 1 on the same diagonal line. The reason for this will be explained with reference to the following figures.

Refer to FIGS. 7A and 7B. FIG. 7B illustrates the record traces on the tape at the back of the mandrel, the location of the tape on the mandrel being shown by FIG. 7A. Considering the orientation of these record traces in the view of FIG. 3, FIG. 3 should be turned upside down so that entrance roller 24 is at the right (as in FIG. 7A), and the record traces are then viewed from the back side and looking through the tape to the tracks on the back side of the tape. The illustration is still for the time that recording of frame 11, field 1 has just started. Parts of the record traces for frame 8, field 1; frame 9, fields 1 and 2; and frame 10, fields 1 and 2 are shown. Note that part of the trace for frame 6, field 1 appears on the same diagonal as frame 9, field 2; but much of this 6th frame, 1st field is in the tape loop. The trace for frame 7, field 1 is on the same diagonal as frame 10, field 2, but it is hidden in the tape loop.

In order to record field 1 of any frame and field 2 of another frame aligned on a diagonal (for convenience and tape economy with certain recording formats), the length of the tape loops should be substantially a whole number multiple of the amount the tape moves for one rotation of the headwheel minus the "loss of recording" distance. However, for satisfactory operation of the recorder and/or reproducer, the tape loop need not have the length above specified. It may be of a different length although the length specified is preferred for the reasons indicated. The tape loop length is measured from point A to point B (FIG. 7A), point A being where the tape leaves the mandrel surface so that recording stops, and point B being where the tape goes to the mandrel surface so that recording begins. In FIG. 7A certain dimensions are given in inches by way of example. The "loss of recording" distance is shown as 0.300 inch. The distance the tape moves during one rotation of the headwheel in this example is 0.714 inch as indicated in FIG. 6A. Therefore, the length of the tape loop in this preferred example is a multiple of 0.714 inch less 0.300 inch as indicated by the legend in FIG. 7A.

In the tape format illustrations the length of loop multiple is three. Therefore, the first field of an earlier recorded frame on the same diagonal as a second field of a later recorded frame is three frames back of the later frame. For example, referring to FIG. 7B, frame 6, field 1 is on the same diagonal as frame 9, field 2. Of course, at the instant of recording or reproducing a frame, the record trace for field 1 is followed immediately by the record trace for field 2 as illustrated for frame 10.

The way in which the record traces are laid down on the tape to produce the tape format may be better understood by referring to FIGS. 8A to 8C. In these figures the tape loop from point A to point B is shown stretched out.

FIG. 8A shows recording starting with frame 20. As the recording head rotates rapidly to record a diagonal trace, the tape is pulled forward continuously at a comparatively slow rate in the direction of head rotation. As the recording of frame 20, field 1 begins, the portion of the tape in the loop is that indicated by the legend "Loop at start of 20–1," where "20" represents the frame, and "1" represents the field.

The length of tape that is pulled forward (toward the right) during one headwheel rotation is the length $\chi$. The length of the loop in this diagram is three times this or $3\chi$. As the headwheel makes one-half a rotation to record frome 20, field 1 (20–1), the tape is pulled forward a length $\frac{1}{2}\chi$. Thus, at the completion of the recording of 20–1 the tape in the loop is the portion indicated by the legend "Loop at end of 20–1." The record head now hits the tape immediately following the end of the loop and begins to record frame 20, field 2 (20–2). To simplify the diagrams, the small "loss of recording" distance is assumed to be zero.

When the headwheel completes one rotation, the trace 20–2 is completed, and the tape has been pulled forward the length $\chi$. The tape in the loop is now the portion indicated by the legend "Loop at end of 20–2 and at start of 21–1." The record trace for frame 21 now begins.

FIG. 8B illustrates the recording of frame 21. The sequence is the same as described for frame 20. The legends indicate the tape portions in the loop at the beginning and end of the fields. Note that the first field of a frame is recorded on the upper half of the tape and that the second field is recorded on the lower half of the tape.

FIG. 8C shows record traces at the time the trace of frame 23 has just been completed, and by a legend indicates the portion of the tape in the loop at this time. It also, by legends, indicates the portions of the tape in the loop at the beginning and end of the fields of frame 22. In FIG. 8C it is assumed that some frames beginning with frame 15 had been recorded prior to the recording of frame 20. From this figure it will be apparent that after the tape leaves the loop the record trace on the upper half of the tape is three frames back of the record trace with which it is aligned on the lower half of the tape. For example, trace 20–1 is aligned with trace 23–2.

Merely by way of example, some dimensions and other values are given below for the specific recorder-reproducer embodiment being described.

Tape width=¼ inch.

Recording head to tape speed is 600 inches per second.

Headwheel speed is 30 rotations per second.

Longitudinal tape speed is 20 inches per second.

Headwheel diameter and mandrel diameter is 6 inches.

The entrance and exit rollers at the mandrel have a diameter of about 0.1 inch.

Angle of record tracks to length of tape is less than one degree.

The mandrel tilt which is the helix angle is 34 minutes.

The record track width is 5 mils, where 1 mil equals 0.001 inch.

The space between record tracks is 2½ mils.

The video head on the headwheel moves in the same direction as the tape motion. This gives an apparent reduction in tape friction due to video head drag on the tape and also some reduction in tape friction due to windage generated by the headwheel.

If desired, the recorder can be designed for video head motion that is in a direction opposite to the direction of the tape motion.

The above dimensions and values are approximate, but they are very close to those actually used in one unit.

Figure 9:
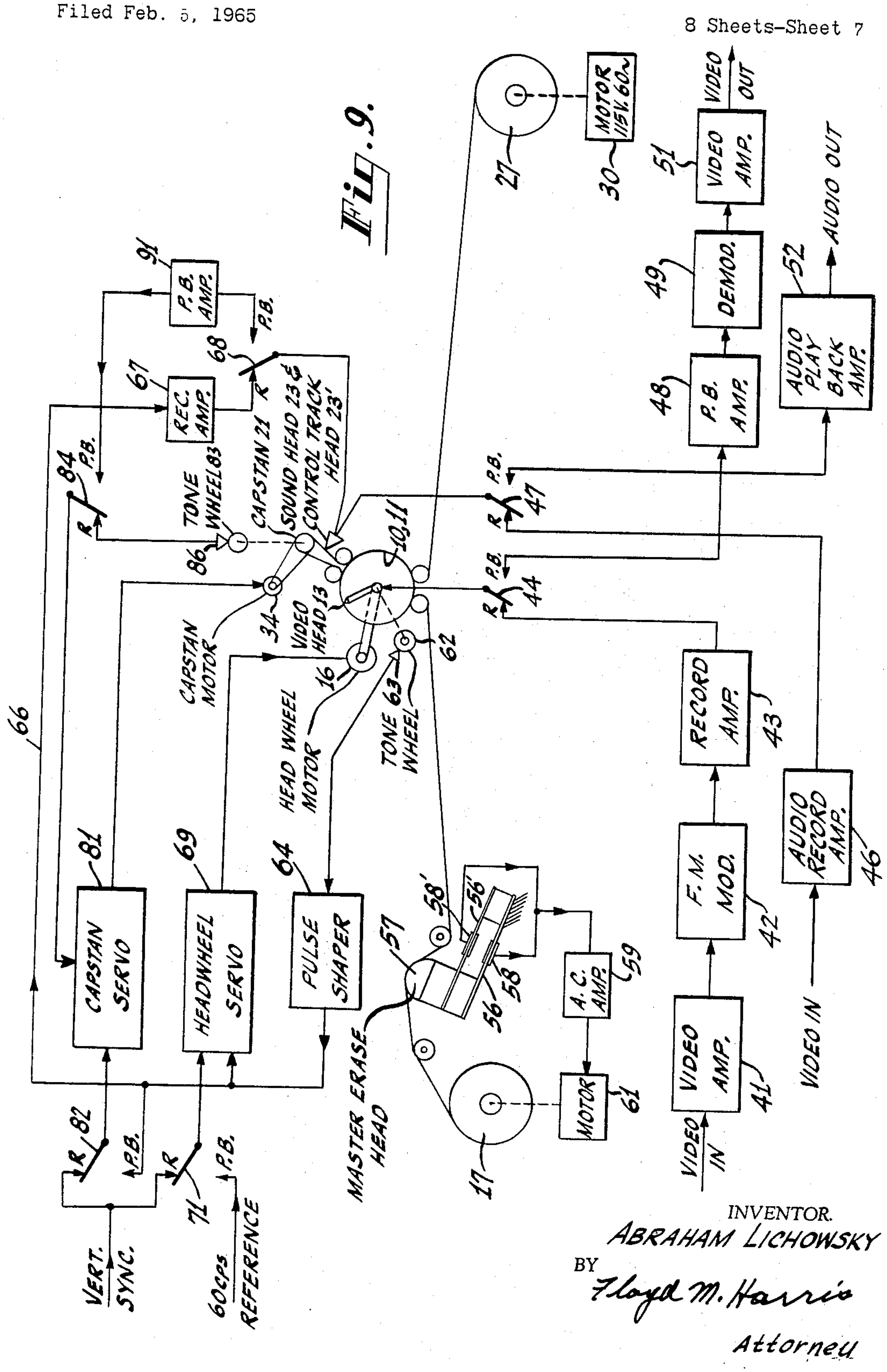
FIG. 9 is a schematic diagram of an embodiment of the present invention including a block diagram of various control circuits.
Figure 10:
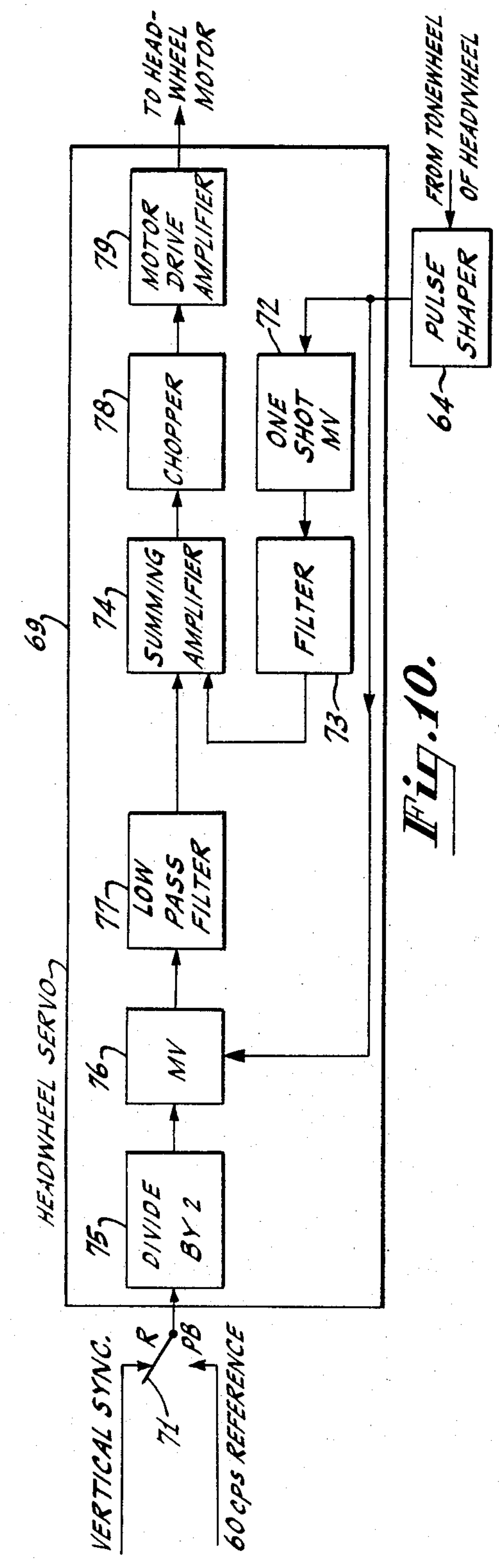
FIG. 10 is a block diagram of the headwheel servo shown in FIG. 9.

FIGS. 9 and 10 illustrate the video electronics and control systems of the recorder-reproducer. The several switches shown are thrown to the position R for recording, and to the position PB for reproducing or playback.

With the switches in the R position, the video signal, after amplification by an amplifier 41, frequency modulates a carrier at the FM modulator 42. This modulated carrier is amplified by amplifier 43 and supplied through a switch 44 to the video recording head 13 through slip rings or other suitable means.

The audio signal after amplification by an amplifier 46 passes through a switch 47 to the sound head 23 which records sound along one edge of the tape as indicated in FIGS. 6B and 7B.

In reproducing, the various switches are in the PB position. The video head 13 supplies video signals through the switch 44 to the playback amplifier 48. The amplified signal is demodulated by a demodulator 49 and amplified by a video amplifier 51. The sound is supplied from the sound head 23 through the switch 47 to an audio playback amplifier 52.

The recorder-reproducer has three control systems, one for the headwheel, one for the capstan, and one for the tension of the tape as it enters the mandrel.

*Tape tension control*

Consider first the tape tension control for holding substantially constant the tape tension between the supply reel and the tape entrance to the mandrel. It may be a conventional type of control system comprising a pair of stiff springs 56, 56′ supported in fixed position at one end and carrying a master erase head 57 at the other end. The tape rides over the erase head and deflects the springs 56, 56′ by an amount depending on the tape tension. Strain gauges 58, 58′ on the springs measure the amount of spring deflection. The strain gauges are connected to the input of an A-C amplifier 59, the output of which controls the amount of supply reel braking provided by a motor 61. The tension of the tape between the take-up reel and the tape exit from the mandrel is maintained substantially constant in a conventional manner by proper selection of the torque-speed characteristic of the take-up reel torque motor 30.

*Headwheel control (recording)*

The headwheel control system synchronizes the headwheel rotation to the vertical synchronizing pulses of the television signal during recording. This ensures that the loss of recorded video signal occurs during the vertical blanking interval. A notched tone wheel 62 mounted on the headwheel shaft produces one pulse for each rotation of the headwheel. This pulse is supplied from a pick-up device 63 to a pulse shaper 64 which supplies a clean narrow pulse over a lead 66 to a recording amplifier 67, then through a switch 68 (during recording) to the control track magnetic head 23′. Thus, the control pulses are recorded on an edge of the tape as indicated in FIGS. 6B and 7B.

The tone wheel pulses are also supplied to a headwheel servo 69. Also, vertical synchronizing pulses are supplied over a switch 71 (during recording) to the headwheel servo 69. The output of the headwheel servo drives the headwheel motor 16, which may be an induction motor, at the proper speed and properly phased so as to keep the video head 13 correctly phased with respect to the vertical synchronizing pulses.

The headwheel servo may take various specific forms, one form being shown in FIG. 10 by way of example. To obtain headwheel angular rate feedback signal, the tone wheel pulses, which occur at the rate of 30 per second, trigger a one-shot multivibrator 72 which generates a constant width, constant amplitude pulse. These pulses (one for each trigger pulse) are averaged by a filter 73 to obtain a voltage proportional to the tone wheel pulse rate and, therefore, the headwheel angular velocity. The output of filter 73 is applied to a summing amplifier 74.

To obtain a phase error signal, the tone wheel pulses are applied to a multivibrator 76 which is "set" by the tone wheel pulse and which is reset during recording by the vertical synchronizing pulse supplied through the switch 71. To make the "reset" pulses occur at the same frequency as the "set" pulses, the vertical synchronizing pulses which recur at the rate of 60 per second are divided by two in a "divide by 2" unit 75 before being applied to multivibrator 76. The output of multivibrator 76 is a constant frequency pulse, the width of which varies with the phase angle between the vertical synchronizing pulse and the tone wheel pulse. This output is averaged in a filter 77 to obtain a voltage proportional to the error in the relative time of occurrence of the tone wheel pulse and the vertical synchronizing pulse. This phase error signal is applied to the summing amplifier 74 where it is summed with the headwheel angular velocity signal. The summed signal is chopped in a chopper 78, and then amplified by a motor drive amplifier 79, the output of which drives the headwheel motor 16.

*Capstan control (recording)*

The capstan control system comprises a capstan servo 81. It maintains a constant tape speed during recording, and synchronizes the tape position with the rotating video head during playback. Except for some circuit constants, the units in the capstan servo are the same as those in the headwheel servo and are indicated by the same reference characters with a prime added. During recording the tone wheel pulses of the headwheel are supplied to servo 81 through a switch 82; also, tone wheel pulses from a capstan notched tone wheel 83 are supplied through a switch 84 to the capstan servo 81. The tone wheel 83 may be mounted on the capstan shaft, and, in the present example, produces tone wheel pulses at the rate of 30 per second. The pulses are produced in a pick-up device 86. Tone wheel pulses at the 30 per second rate are obtained by providing the tone wheel 83 with the proper number of notches, and by making the capstan of the proper diameter so that it is rotating at the proper angular velocity as it pulls the tape through at the correct tape speed.

During recording, the capstan tone wheel pulses are applied through switch 84 to the one-shot multivibrator 72' which produces a constant width, constant amplitude pulse at the trigger rate. These pulses are averaged by a filter 73' to obtain a voltage proportional to the tone wheel pulse rate and, therefore, the angular velocity of the capstan. The output of filter 73' is applied to the summing amplifier 74'.

To obtain a phase error signal, the tone wheel pulses are applied to the multivibrator 76' which is "set" by the tone wheel pulse and which is reset during recording by either the vertical synchronizing pulse or by a 60 cycle per second reference signal from the local power line, as preferred. The vertical synchronizing pulse recurring at 60 pulses per second or the 60 c.p.s. line signal, whichever is used, is divided by two by the "divide by 2" unit 75' before being applied to multivibrator 76' for resetting it. The output of multivibrator 76' is a constant frequency pulse, the width of which varies with the phase angle between the vertical synchronizing pulse (or the 60 c.p.s. reference signal) and the tone wheel pulse. This output is averaged by a filter 77' to obtain a voltage proportional to the error in the relative time of occurrence of the tone wheel pulse and the vertical synchronizing pulse (or the 60 c.p.s. reference signal). This phase error signal is applied to the summing amplifier 74' where it is summed with the capstan angular velocity signal. The summed signal is chopped in a chopper 78', and then amplified by a motor drive amplifier 79', the output of which drives the capstan motor 34.

*headwheel control (playback)*

During playback the various switches are thrown to the playback position indicated by PB. The headwheel tone wheel pulses are applied to the headwheel serve 69 as during recording. The reference signal applied to the headwheel servo is a 60 cycle per second signal applied from the local power line through the switch 71 to the servo. The headwheel servo 69 operates the same as described for recording to maintain the headwheel at the correct speed and phase.

*Capstan control (playback)*

Figure 11:
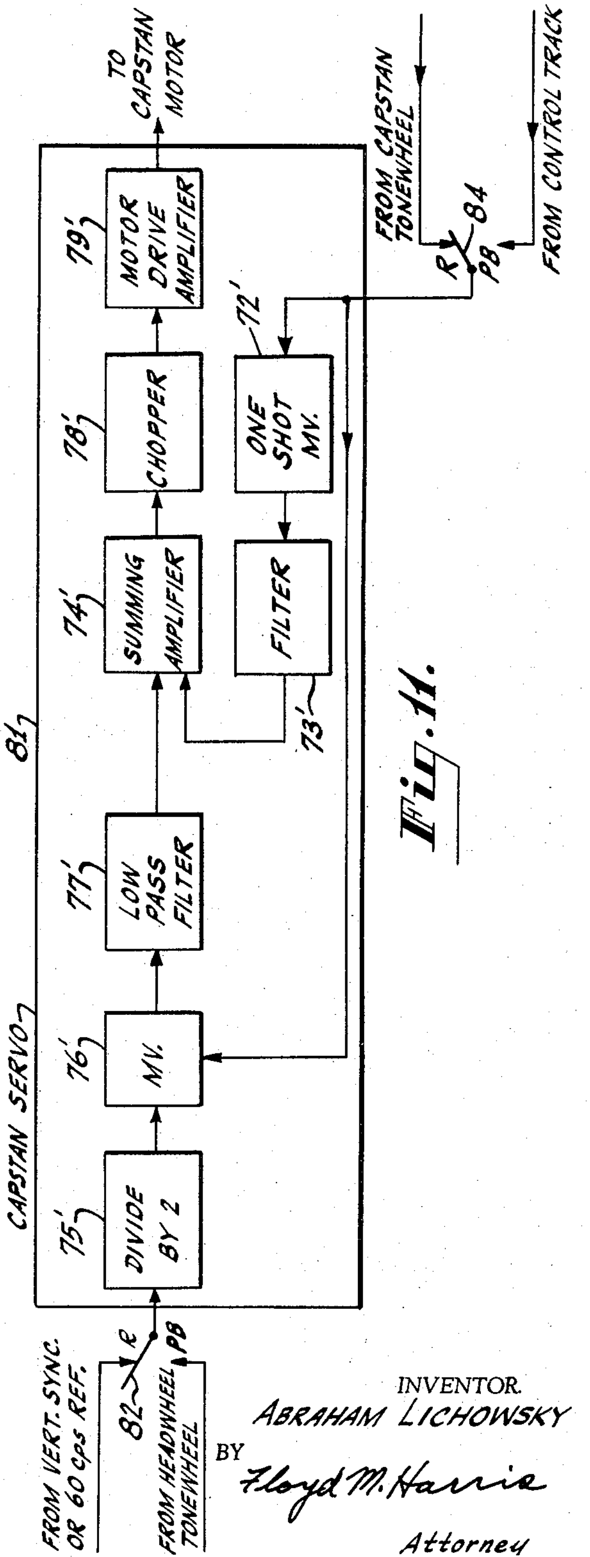
FIG. 11 is a block diagram of the capstan servo shown in FIG. 1.

During playback the control pulses on the tape control track are picked up by the control track head 23' and supplied through the switch 68, an amplifier 91, and the switch 84 to the capstan servo 81. Also, headwheel tone wheel pulses are supplied through the switch 82 to the capstan servo 81. By referring to FIG. 11, it will be seen that the servo 81 operates the same as described for recording to maintain the capstan at the correct speed and phase so that the tape position is synchronized with the rotating video head during playback.

What is claimed is:

1. A device for recording and/or reproducing signals on a tape, said device comprising a mandrel, said tape being supplied from a source of tape supply to said mandrel at an entrance point and being taken off said mandrel at an exit point, said tape being wrapped in non-driven relation around said mandrel from said entrance point to said exit point, a capstan positioned adjacent to said mandrel and at a location intermediate said entrance and exit points, means for guiding said tape off said mandrel at said intermediate location to said capstan to be driven thereby, and means for guiding said tape from said capstan to said mandrel at said intermediate location whereby the tape wrap-around on said mandrel is interrupted at said intermediate location by a loop of tape passing over said capstan.

2. A device for recording and/or reproducing signals on a tape, said device comprising a mandrel, said tape being supplied from a source of tape supply to said mandrel at an entrance point and being taken off said mandrel at an exit point, said tape being wrapped around said mandrel in a helical path from said entrance point to said exit point, a capstan positioned adacent to said mandrel and at a location intermediate said entrance and exit points, means for guiding said tape off said mandrel at said intermediate location to said capstan to be driven thereby, means for guiding said tape from said capstan to said mandrel at said intermediate location whereby the tape wrap-around on said mandrel is interrupted at said intermediate location by a loop of tape passing over said capstan, a recording and/or reproducing head, means for rotating said head in a plane perpendicular to the axis of said mandrel and in recording and/or reproducing relation to said tape whereby during recording a record trace is made diagonal to the length of the tape, and take-up means for pulling the tape off said mandrel at said exit point during recording or reproducing.

3. A device for recording and/or reproducing signals on a tape, said device comprising a mandrel which comprises two cylinders positioned end-to-end with a gap therebetween, said tape being supplied from a source of tape supply to said mandrel at an entrance point and being taken off said mandrel at an exit point, said tape being wrapped around said mandrel in a helical path from said entrance point to said exit point, a capstan positioned adjacent to said mandrel and at a location intermediate said entrance and exit points, means for guiding said tape off said mandrel at said intermediate location to said capstan to be driven thereby, means for guiding said tape from said capstan to said mandrel at said intermediate location whereby the tape wrap-around on said mandrel is interrupted at said intermediate location by a loop of tape passing over said capstan, a headwheel on the periphery of which is mounted a recording and/or reproducing head, said headwheel being mounted to rotate said head in said mandrel gap and in recording and/or reproducing relation to said tape whereby during recording a record trace is made diagonal to the length of the tape, and take-up means for pulling the tape off said mandrel at said exit point during recording or reproducing.

4. A device for recording and/or reproducing signals on a tape, said device comprising a mandrel, said tape being supplied from a supply reel to said mandrel at an entrance point at which point there is an entrance roller and being taken off said mandrel at an exit point approximately 360 degrees from said entrance point, there being an exit roller at said exit point, said tape being wrapped around said mandrel from said entrance point to said exit point, a capstan positioned adjacent to said mandrel and at a location intermediate said entrance and exit points, means including an intermediate location exit roller for guiding said tape off said mandrel at said intermediate location to said capstan to be driven thereby, and means including an intermediate location entrance roller for guiding said tape from said capstan to said mandrel at said intermediate location whereby the tape wrap-around on said mandrel is interrupted at said intermediate location by a loop of tape passing over said capstan, and take-up means including a take-up reel for pulling the tape off said mandrel at said exit point during recording or reproducing, the axis of said mandrel being at a small angle $\alpha$ with respect to the perpendicular to a reference plane, the axes of said first-mentioned entrance and exit rollers being at right angles to said reference plane, and the axes of said intermediate location exit and entrance rollers and the axis of said capstan being at the angle $2\alpha$ with respect to the perpendicular to said reference plane.

5. A device for recording and/or reproducing signals on a tape, said device comprising a mandrel, said tape being supplied from a supply reel to said mandrel at an entrance point at which point there is an entrance roller and being taken off said mandrel at an exit point approximately 360 degrees from said entrance point, there being an exit roller at said exit point, said tape being wrapped around said mandrel from said entrance point to said exit point, a capstan positioned adjacent to said mandrel and at a location intermediate said entrance and exit points, means including an intermediate location exit roller for guiding said tape off said mandrel at said intermediate location to said capstan to be driven thereby, and means including an intermediate location entrance roller for guiding said tape from said capstan to said mandrel at said intermediate location whereby the tape wrap-around on said mandrel is interrupted at said intermediate location by a loop of tape passing over said capstan, and take-up means including a take-up reel for pulling the tape off said mandrel at said exit point during recording or reproducing, the axes of said supply and take-up reels being at right angles to a reference plane, the axis of said mandrel being at a small angle $\alpha$ with respect to the axes of said reels, the axes of said first-mentioned entrance and exit rollers being at right angles to said reference plane, the axes of said intermediate location exit and entrance rollers and the axis of said capstan being at the angle $2\alpha$ with respect to the axes of said reels.

6. A device for recording and/or reproducing signals on a tape, said device comprising a mandrel, said tape being supplied from a supply reel to said mandrel at an entrance point at which point there is an entrance roller and being taken off said mandrel at an exit point slightly less than 360 degrees from said entrance point, there being an exit roller at said exit point, said tape being wrapped around said mandrel in a helical path from said entrance point to said exit point, a capstan positioned adjacent to said mandrel and at a location intermediate said entrance and exit points, means including an intermediate location exit roller for guiding said tape off said mandrel at said intermediate location to said capstan to be driven thereby, and means including an intermediate location entrance roller for guiding said tape from said capstan to said mandrel at said intermediate location whereby the tape wrap-around on said mandrel, is interrupted at said intermediate location by a loop of tape passing over said capstan, a recording and/or reproducing head, means for rotating said head in a plane that is at an angle to the length of the tape wrapped around said mandrel and in recording and/or reproducing relation to said tape, and take-up means including a take-up reel for pulling the tape off said mandrel at said exit point during recording or reproducing, the axis of said mandrel being at a small angle $\alpha$ with respect to the perpendicular to a reference plane, the axes of said first-mentioned entrance and exit rollers being at right angles to said reference plane, and the axes of said intermediate location exit and entrance rollers and the axis of said capstan being at the angle $2\alpha$ with respect to the perpendicular to said reference plane, and means for guiding said tape through said helical path around said mandrel with one edge of said tape at said entrance point being positioned to one side of the plane of rotation of said head so that said head as it rotates comes into recording relation to said tape at a small distance from said one edge and with the other edge of said tape at said exit point being positioned to the other side of the plane of rotation of said head so that said head as it rotates moves out of recording relation to said tape at a small distance from said other edge of said tape whereby along each edge of said tape there is a narrow strip on which no recording is made by said head during recording.

7. The invention according to claim 6 in which there is a control track head in recording or reproducing relation to said loop of tape with said head in recording or reproducing relation to said narrow strip along one edge of the tape.

8. The invention according to claim 6 in which there is a sound head and a control track head each in recording or reproducing relation to said loop of tape with the sound head in recording or reproducing relation to said narrow strip along one edge of the tape and with the control track head in recording or reproducing relation to said narrow strip along the other edge of the tape.

9. A device for record and/or reproducing signals on a tape, said device comprising a mandrel, said tape being supplied from a source of tape supply to said mandrel at an entrance point and being taken off said mandrel at an exit point approximately 360 degrees from said entrance point, said tape being wrapped around said mandrel in a helical path from said entrance point to said exit point, a capstan positioned adjacent to said mandrel and at an intermediate location which is approximately 180 degrees from said entrance point, means for guiding said tape off said mandrel at said intermediate location to said capstan to be driven thereby, means for guiding said tape from said capstan to said mandrel at said intermediate location whereby the tape wrap-around on said mandrel is interrupted at said intermediate location by a loop of tape passing over said capstan, a recording and/or reproducing head, means for rotating said head in a plane perpendicular to the axis of said mandrel and in recording and/or reproducing relation to said tape whereby during recording a record trace is made diagonal to the length of the tape, means for driving said capstan so that it pulls the tape through the first 180 degrees of helical wrap and meters it through the second 180 degrees of helical wrap, means for maintaining substantially constant the tension of the tape between said source of tape supply and said entrance point, and take-up means for pulling the tape off said mandrel at said exit point during recording or reproducing and for maintaining substantially constant the tension of the tape leaving said exit point.

References Cited

UNITED STATES PATENTS 2,681,591 6/1954 Nyman ---------- 179—100.2

BERNARD KONICK, *Primary Examiner.*

J. R. GOUDEAU, *Assistant Examiner.*